US009575797B2

(12) United States Patent
Linton et al.

(10) Patent No.: US 9,575,797 B2
(45) Date of Patent: Feb. 21, 2017

(54) VIRTUAL MACHINE MIGRATION BETWEEN HYPERVISOR VIRTUAL MACHINES AND CONTAINERS

(71) Applicant: International Business Machines Corporation, Armonk, NY (US)

(72) Inventors: Jeb Linton, Manassas, VA (US); Dmitry Rekesh, Pleasanton, CA (US); Boden Russell, Colorado Springs, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/663,794

(22) Filed: Mar. 20, 2015

(65) Prior Publication Data

US 2016/0274928 A1 Sep. 22, 2016

(51) Int. Cl.
*G06F 9/46* (2006.01)
*G06F 9/455* (2006.01)

(52) U.S. Cl.
CPC .. *G06F 9/45558* (2013.01); *G06F 2009/4557* (2013.01); *G06F 2009/45591* (2013.01)

(58) Field of Classification Search
CPC ......... G06F 9/45558; G06F 2009/4557; G06F 2009/45591
See application file for complete search history.

(56) References Cited

U.S. PATENT DOCUMENTS

| 8,468,518 | B2 | 6/2013 | Wipfel | |
|---|---|---|---|---|
| 8,762,945 | B2 | 6/2014 | Arnold et al. | |
| 2008/0235378 | A1* | 9/2008 | Fried | G06F 9/5077 709/226 |
| 2014/0223163 | A1* | 8/2014 | Tabone | G06F 11/1417 713/2 |
| 2015/0271014 | A1* | 9/2015 | Madama | H04L 41/0893 709/222 |

OTHER PUBLICATIONS

"A Simple LD Preload Tutorial—good coders code, great reuse", noted by Inventor in Main Idea dated Nov. 4, 2014, <http://www.catonmat.net/blog/simple-Id-preload-turorial/>.

(Continued)

*Primary Examiner* — Camquy Truong
(74) *Attorney, Agent, or Firm* — Maeve Carpenter

(57) ABSTRACT

An approach for virtual machine migration between hypervisor virtual machines and containers is provided. The approach performs, by one or more computer processors, an initial inspection of an image. The approach assigns, by one or more computer processors, an initial status to the image, wherein the initial status identifies a type of virtualization realization compatible with the image. The approach performs, by one or more computer processors, a series of checks for container incompatibilities. The approach determines, by one or more computer processors, whether the image can be realized as a container. Responsive to a determination that the image can be realized as a container, the approach realizes, by one or more computer processors, the image in a container based virtualization.

20 Claims, 4 Drawing Sheets

(56) References Cited

OTHER PUBLICATIONS

"Hypervisor", from Wikipedia, the free encyclopedia, noted by Inventor in Main Idea dated Nov. 4, 2014, <http://en.wikipedia.org/wiki/Hypervisor>.
"KB Parallels: Converting Virtual Containers, Virtual Machines and Hardware Nodes to each other", noted by Inventor in Main Idea dated Nov. 4, 2014, <http://kb.sp.parallels.com/en/6324>.
"KB Parallels: Migrating a Virtual Machine to Container", noted by Inventor in Main Idea dated Nov. 4, 2014, <http://kb.sp.parallels.com/en/6676>.
Kolyshkin Kir, "Open VZ Linux Containers", OpenStack Design Summit, Apr. 16, 2012, San Francisco, <http://www.slideshare.net/kolyshkin/openvz-linux-containers>.
"Realizing Linux Containers (LXC) Building Blocks, Underpinnings & Motivations", noted in Main Idea dated Nov. 4, 2014, <http://www.slideshare.net/BodenRussell/realizing-linux-containerslxc>.
"System Programming: Hijack Linux System Calls: Part III. System Call Table", Oct. 13, 2011, <http.//syprog.blogspot.com/2011/10/hijack-linux-system-calls-part-iii.html>.
Xavier et al., "Performance Evaluation of Container-based Virtualization for High Performance Computing Environments", Copyright 2012 IEEE (accepted for publication in IEEE PDP 2013.

\* cited by examiner

VIRTUAL MACHINE MIGRATION BETWEEN HYPERVISOR VIRTUAL MACHINES AND CONTAINERS

TECHNICAL FIELD

The present invention relates generally to virtual machine migration, and more particularly to migrating virtual machine images between virtual machines and containers.

BACKGROUND

Virtualization creates a level of indirection or an abstraction layer between, for example, a physical object and a managing application. Virtualization may be a framework (i.e., methodology) for dividing the resources of a computer into multiple execution environments. A key benefit of virtualization is the ability to run multiple operating systems (OS) on a single physical server and share underlying hardware resources (i.e., partitioning).

OS and application virtualization in cloud computing may be realized using traditional virtual machines (VM) and Linux® Containers (LXC)(Linux is a registered trademark of Linus Torvalds in the United States, other countries, or both). VMs may include a fully virtualized OS within a type 1 (i.e., native, bare metal) or type 2 (i.e., hosted) hypervisor. LXCs are a lightweight virtualization technology able to virtualize a Linux OS (less the kernel) and one or more applications by leveraging features provided by a modern Linux Kernel.

Migrating VMs and containers between servers may include copying the whole contents of a VM (i.e., files, directories, quota limits, configuration settings, etc.) to a container on a server. Traditionally, when migrating a VM to a container, a user may initiate a command to migrate the VM after manually determining the VM to be migrated satisfies various requirements, such that the VM can be realized in a container based environment.

SUMMARY

Aspects of the present invention provide an approach for virtual machine migration between hypervisor virtual machines and containers, in accordance with an embodiment of the present invention. In one aspect, a method includes performing, by one or more computer processors, an initial inspection of an image. The method includes assigning, by one or more computer processors, an initial status to the image, where the initial status identifies a type of virtualization realization compatible with the image. The method includes performing, by one or more computer processors, a series of checks for container incompatibilities. The method includes determining, by one or more computer processors, whether the image can be realized as a container. Responsive to a determination that the image can be realized as a container, the method includes realizing, by one or more computer processors, the image in a container based virtualization.

In another aspect, a computer program product includes program instructions to perform, by one or more computer processors, an initial inspection of an image. The computer program product includes program instructions to assign, by one or more computer processors, an initial status to the image, wherein the initial status identifies a type of virtualization realization compatible with the image. The computer program product includes program instructions to perform, by one or more computer processors, a series of checks for container incompatibilities. The computer program product includes program instructions to determine, by one or more computer processors, whether the image can be realized as a container. Responsive to a determination that the image can be realized as a container, the computer program product includes program instructions to realize, by one or more computer processors, the image in a container based virtualization.

In yet another aspect, a computer system includes program instructions to perform, by one or more computer processors, an initial inspection of an image. The computer system includes program instructions to assign, by one or more computer processors, an initial status to the image, wherein the initial status identifies a type of virtualization realization compatible with the image. The computer system includes program instructions to perform, by one or more computer processors, a series of checks for container incompatibilities. The computer system includes program instructions to determine, by one or more computer processors, whether the image can be realized as a container. Responsive to a determination that the image can be realized as a container, the computer system includes program instructions to realize, by one or more computer processors, the image in a container based virtualization.

In yet another aspect, a method for deploying a system for virtual machine migration between hypervisor virtual machines and containers includes providing a computer infrastructure being operable to perform, by one or more computer processors, an initial inspection of an image. The method includes providing a computer infrastructure being operable to assign, by one or more computer processors, an initial status to the image, where the initial status identifies a type of virtualization realization compatible with the image. The method includes providing a computer infrastructure being operable to perform, by one or more computer processors, a series of checks for container incompatibilities. The method includes providing a computer infrastructure being operable to determine, by one or more computer processors, whether the image can be realized as a container. Responsive to a determination that the image can be realized as a container, the method includes providing a computer infrastructure being operable to realize, by one or more computer processors, the image in a container based virtualization.

In yet another aspect, performing a series of checks for container incompatibilities includes monitoring, by one or more computer processors, an image at one or more phases throughout one or more states in virtualization for a life cycle of an image virtualization, and inspecting, by one or more computer processors, the image throughout each of the one or more phases in the one or more states in virtualization, where inspecting includes scanning the image for a plurality of particular scenarios incompatible with container virtualization.

In yet another aspect, performing the initial inspection of the image includes scanning, by one or more computer processors, the image to determine whether a guest operating system within the image is an operating system variant compatible with container-based virtualization, and scanning, by one or more computer processors, the image to determine whether boot instructions for the image contain a non-standard kernel module for loading a container-based virtualization environment.

In yet another aspect, determining whether the image can be realized as a container includes determining, by one or more computer processors, whether the image falls outside one or more bounds of container virtualization, where determining the image falls outside one or more bounds of container virtualization includes detecting one or more scenarios from a plurality of particular scenarios incompatible with container virtualization.

DETAILED DESCRIPTION

Embodiments of the present invention recognize that from both a user and a provider perspective, LXC is a more optimal approach when compared to traditional virtualization. Embodiments of the present invention further recognize that there is a need for a means to seamlessly and transparently detect image compatibility, and dynamically scale an image between a LXC and a VM based, at least in part, on image compatibility. Embodiments of the present invention further recognize that existing techniques provide a means to manually migrate images between VMs and LXCs, however, existing techniques do not provide a means to seamlessly optimize and migrate an image from LXCs to VMs when the image falls outside the bounds of an LXC realization (i.e., not LXC compatible). Embodiments of the present invention further recognize that, from both a user and provider perspective, LXC is a more optimal approach compared to traditional virtualization. LXC operations (e.g., start, stop, restart, etc.) can run in seconds/milliseconds, which is much faster than traditional virtualization. LXC is very lightweight from a runtime perspective, with minimal per VM penalty, allowing for a much greater density potential, from a provider perspective, compared to traditional virtualization. LXC code can be given direct access to native OS resources. LXC provides a means to transparently run workloads on both bare metal and virtualized environments, and, since LXC does not require hypervisor translation, near bare metal performance speeds are attainable.

Embodiments of the present invention provide the capability to seamlessly and transparently detect image compatibility, and based, at least in part on an image's compatibility, dynamically scale the image between a LXC and a VM. Embodiments of the present invention further provide a virtualization system that realizes an image as a LXC, and employs logic to automatically migrate an image to a traditional VM as needed. Embodiments of the present invention provide the capability to dynamically scale an image between LXCs and VMs utilizing a phased detection approach, where the system initially assumes the image is LXC compatible, and further monitors the image at various points throughout the virtualization process to determine if the image falls outside the bounds of an LXC realization. Embodiments of the present invention provide the capability to maintain an association between the image and its virtualization capability, such that when the image is determined to not be LXC compatible, the image is realized utilizing traditional virtualization.

Figure 1:
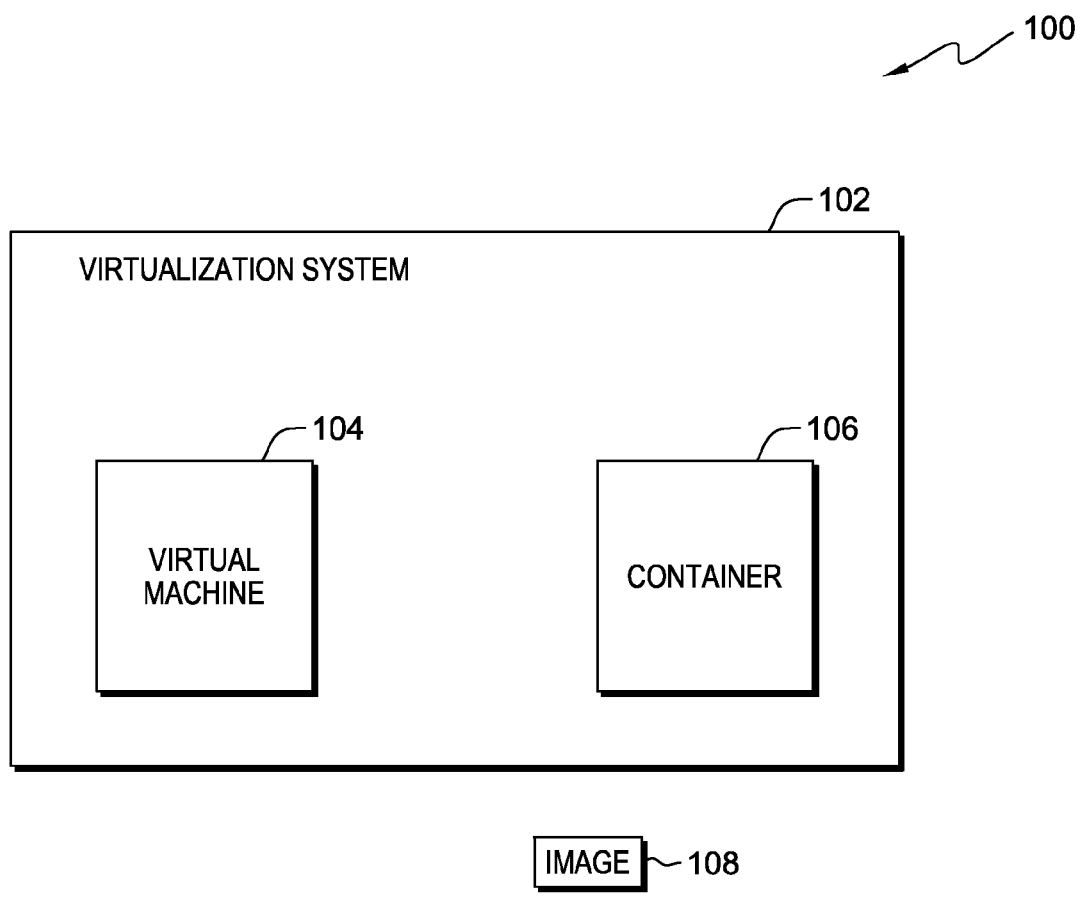
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Data processing environment 100 includes a virtualization system 102 and an image 108.

In one embodiment, virtualization system 102 is a server capable of supporting a hybrid virtualization environment, the hybrid virtualization environment including, for example, support for both Linux container virtualization and traditional virtualization in a hypervisor-based environment. In other embodiments, virtualization system 102 may be capable of supporting elements of containment type virtualization environments, including, but not limited to, docker containers, parallels containers, and jail technologies, etc. In one embodiment, virtualization system 102 supports virtual machine migration between hypervisor virtual machines and containers. In one embodiment, virtualization system 102 includes a software-based program (not shown) for virtual machine migration between hypervisor virtual machines and containers, where the software-based program includes computer system-executable instructions, such as program modules, being executed by virtualization system 102 to support operations for virtual machine migration between hypervisor virtual machines and containers. In one embodiment, virtualization system 102 may be, for example, a server computer system such as a management server, web server, or any other electronic device or computing system capable of sending and receiving data. In another embodiment, virtualization system 102 may be a data center, consisting of a collection of networks and servers providing an IT service, such as virtual servers and applications deployed on virtual servers, to an external party. In another embodiment, virtualization system 102 represents a "cloud" of computers interconnected by one or more networks, where virtualization system 102 is a computing system utilizing clustered computers and components to act as a single pool of seamless resources when accessed through a network (not shown). This is a common implementation for data centers in addition to cloud computing applications. Virtualization system 102 includes virtual machine 104 and container 106.

In one embodiment, virtual machine 104 is a traditional virtual machine in a hypervisor-based environment. A traditional virtual machine is an emulation of a particular computer system. Traditional virtual machines operation based on the computer architecture and functions of a real or hypothetical computer, and their implementations can involve specialized hardware, software, or a combination of both. In a hypervisor-based environment, a hypervisor is a piece of computer software, firmware, or hardware that is capable of creating and operating one or more virtual machines. A type 1 hypervisor is a native, bare metal hypervisor that operates directly on a host computer's hardware to control the hardware and manage guest operating systems. A type 2 hypervisor is a hypervisor that operates within a conventional operating system environment (i.e., hosted) as a distinct software layer to manage guest operating systems. In one embodiment, virtual machine 104 consists of a virtual machine monitor on top of a host operating system that provides a full abstraction of virtual machine 104, such that virtual machine 104 has its own operating system that executes completely isolated from one or more other virtual machines (not shown), allowing for execution of multiple different operating systems on a single host. In one embodiment, virtual machine 104 includes a fully virtualized operating system within a type 1 or type 2 hypervisor.

In one embodiment, container 106 is a conventional Linux container (LXC) utilized in LXC technologies (i.e., container-based virtualization). Container 106 includes a physical hardware, a kernel, and a plurality of user-space instances. Container 106 is a lightweight alternative to virtual machine 104 capable of partitioning physical machine resources, creating multiple isolated user-space instances. Container 106 works at the operation system level, providing abstractions directly for guest processes. Container 106 shares a single operating system kernel with one or more other containers (not shown), such that container 106 looks and executes like a stand-alone operating system. Container 106 provides for high density natural page sharing, as well as dynamic resource allocation. Container 106 provides for near-native performance (i.e., bare metal performance), resulting in very low overhead costs. In another embodiment, container 106 may be, for example, a conventional container that has applications beyond a conventional LXC or other operating systems, including, but not limited to, Parallels® containers, Windows® containers, Docker containers, jail technology, etc. (Microsoft, Windows, Windows NT, and the Windows logo are trademarks of Microsoft Corporation in the United States, other countries, or both).

In one embodiment, image 108 is a file (i.e., a guest image) from which an operable virtual machine or container can be created. Image 108 contains data related to a state of a disc. In one embodiment, image 108 may be an operating system that can be realized on a virtual machine or container. In another embodiment, image 108 may be an application that can be realized on a virtual machine or container.

Figure 2:
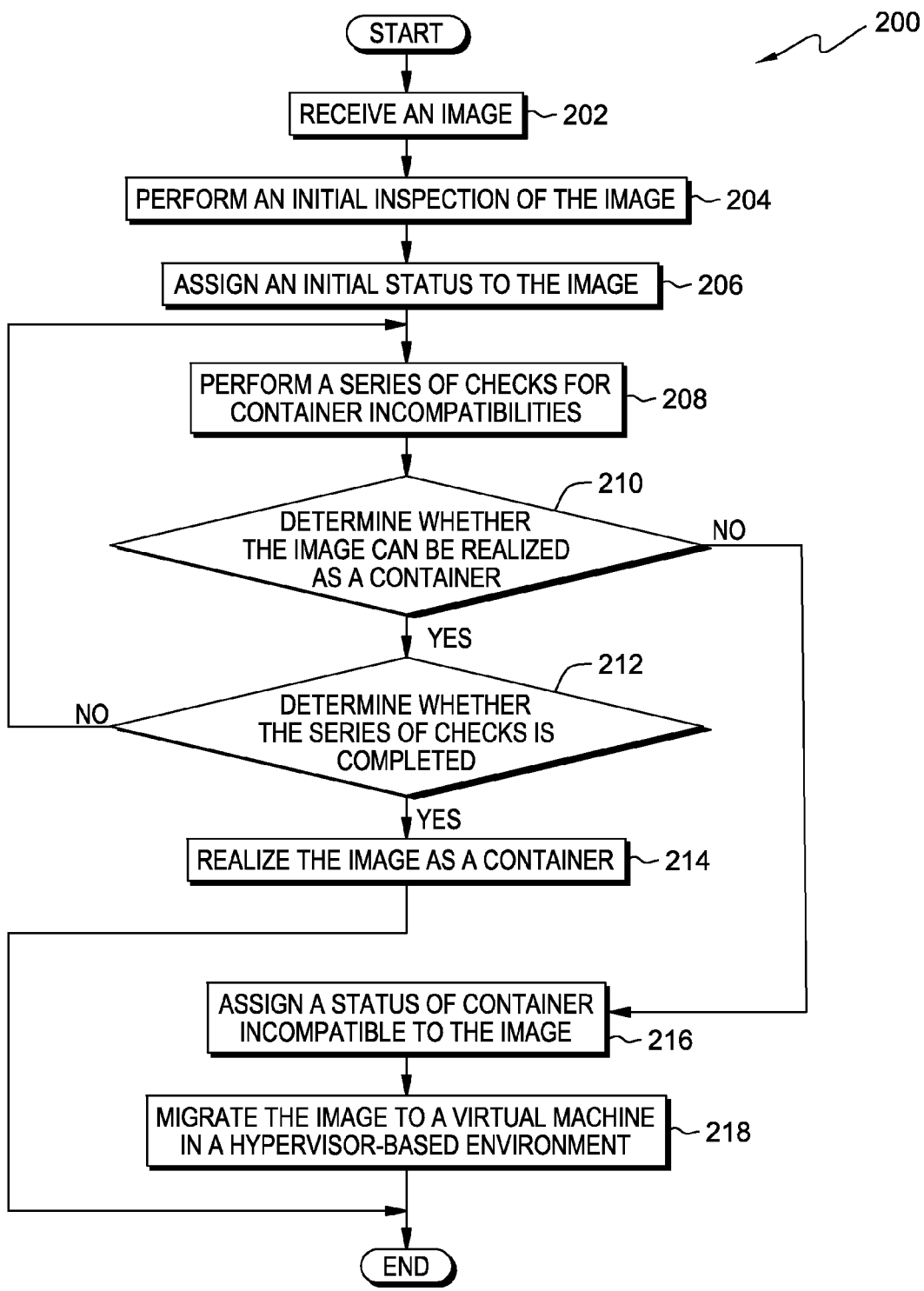
FIG. 2 is a flowchart depicting the steps of a virtualization system, in accordance with an embodiment of the present invention.

FIG. 2 is a flowchart depicting the steps of a virtualization system, such as virtualization system 102 of FIG. 1, for virtual machine migration between hypervisor virtual machines and containers, in accordance with an embodiment of the present invention.

Virtualization system 102 receives an image (202). In one embodiment, virtualization system 102 receives an image provisioned by a user, where the user is unaware of the virtualization realization of the image (i.e., the user lacks perceptual awareness of whether the image can be realized as a container or as a traditional virtual machine in a hypervisor-based environment). Receiving an image provisioned by a user, where the user is unaware of the virtualization realization of the image is advantageous because it allows a user to reap the benefits of both approaches to virtualization realization (i.e., container-based virtualization and traditional hypervisor-based virtualization) without user intervention or perceptual awareness.

Virtualization system 102 performs an initial inspection of the image (204). In one embodiment, virtualization system 102 performs the initial inspection of the image during an image import phase (i.e., when the image is imported into virtualization system 102). Virtualization system 102 performs the initial inspection of the image by processing the image, where processing includes scanning the image to determine whether the guest operating system is an operating system variant that is container compatible (i.e., within the bounds of where container-based virtualization can be utilized for image realization), and to determine whether the image's boot instructions contains a non-standard kernel module for loading the container-based virtualization environment. In one embodiment, container compatible images are Linux variants which have the same endian/architecture as a host operating the images. In one embodiment, a non-standard kernel module is a kernel module that does not match container technology (e.g., custom modules with container incompatible kernel extensions).

Virtualization system 102 assigns an initial status to the image (206). In one embodiment, virtualization system 102 assigns an initial status to the image based, at least in part, on information gathered in the initial inspection of the image. Where virtualization system 102 determines the guest operating system is an operating system variant that is container compatible and the image does not include a non-standard kernel module (i.e., the image's kernel module is shared between the operating system and the container technology), virtualization system 102 assigns a status of container compatible to the image. For example, virtualization system 102 may utilize a flag to designate an image as container compatible. Where virtualization system 102 determines the guest operating system is not an operating system variant that is container compatible or the image includes a non-standard kernel module (e.g., a custom kernel module with container incompatible kernel extensions), virtualization system 102 assigns a status of container incompatible to the image. In one embodiment, virtualization system stores a plurality of images prior to provisioning into a virtualization environment according to the assigned statuses. Assigning a status to the image based, at least in part, on information gathered in the initial inspection of the image is advantageous because it allows a user to reap the benefits of both approaches to virtualization realization (i.e., container-based virtualization and traditional hypervisor-based virtualization) without user intervention or perceptual awareness.

Virtualization system 102 performs a series of checks for container incompatibilities (208). In one embodiment, in response to user input to provision an image, virtualization system 102 performs a series of checks for container incompatibilities utilizing a phase detection approach, where the phase detection approach includes monitoring the image at various points (i.e., phases) throughout one or more states (i.e., transitions) in virtualization to determine whether the image, at any given point during virtualization, falls outside the bounds of container realization. In one embodiment, the bounds of container realization (i.e., particular scenarios where container-based virtualization cannot be used) include, without limitation, a scenario where the image is a non-Linux operating system, such as a Windows guest image, a scenario where the image makes use of custom Linux kernel modules that are not applicable or desirable to expose to other images (i.e., guests) on a host system, a scenario where a host system does not support container virtualization technologies due to a back-leveled Linux kernel or an unsupported host operating system, a scenario where the image is of a different architecture than a host, and a scenario where an application, a process, or a user of the image requires access to system calls that are restricted on a container host system (e.g., restrictions enforced via Linux Capabilities).

In one embodiment, the various points (i.e., phases) throughout the one or more states (i.e., transitions) in virtualization include, without limitation, a provision (i.e., boot) time instructions phase, such as when an image is deployed within virtualization system 102, and a runtime system call phase, such as when a virtualization of the image is already operating as a container-based virtualization and a user(s) has access to the container virtual system. In one embodiment, virtualization system 102 seamlessly monitors the image/virtualization for its complete life cycle, where the complete life cycle begins, for example, when an image is provisioned, and continues through a fully operational virtualization (e.g., container based virtualization or traditional virtualization), such that if any incompatibilities with container virtualization arise, virtualization system 102 automatically migrates the image/virtualization to a traditional virtual machine without the need for user input. Performing a series of checks for container incompatibilities throughout the complete life cycle of the image/virtualization is advantageous because it allows a user to reap the benefits of both approaches to virtualization realization (i.e., container-based virtualization and traditional hypervisor-based virtualization) without user intervention or perceptual awareness.

Visualization system 102 determines whether the image can be realized as a container (210). In one embodiment, visualization system 102 determines whether the image can be realized as a container by inspecting the image throughout each of one or more phases in virtualization, where inspecting includes scanning for a plurality of particular scenarios (i.e., bounds) where container virtualization cannot be utilized. For example, in a provision (i.e., boot) time instructions phase, when a user boots an image currently flagged as container compatible, virtualization system 102 may support preload (i.e., bootstrapping) instructions for the image. The user may be able to specify additional packages or commands to run when booting the image, which may result in non-standard modules being loaded, thereby modifying and rendering the image no longer container compatible. During this phase, virtualization system 102 inspects the preload instructions for the image to ensure that the user has not loaded non-container modules (i.e., container incompatible modules). In another example, in a runtime system call monitoring phases, an image is operating as a container, such as container 106, and a user has access to the container virtualization system of container 106. Virtualization system 102 monitors and intercepts certain system calls on behalf of container processes to ensure these processes do not exceed the bounds of container virtualization, such as the user attempting to install or load additional kernel modules and system calls that are restricted via capabilities or container confinement, etc. In this example, virtualization system 102 hosting a container, such as container 106, owns the host resources (e.g., kernel, system tables, etc.), thereby allowing virtualization system 102 to seamlessly intercept system calls to the image (e.g., the image does not require patching or injection) transparently (i.e., without user intervention or perceptual awareness), which is an advantage over existing methods since a user can manipulate aspects of an image/virtualization without having to consider which virtualization environment (i.e., container-based virtualization or traditional hypervisor-based virtualization) the image/virtualization will be realized in.

In one embodiment, where virtualization system detects one or more bounds from the plurality of particular scenarios incompatible with container virtualization, virtualization system determines that the image cannot be realized as a container. For example, where virtualization system 102 detects the image, such as image 108, makes use of non-standard Linux kernel modules that are incompatible with container virtualization, virtualization system 102 determines that the image cannot be realized as a container, such as container 106.

In one embodiment, where virtualization system does not detect one or more bounds from the plurality of particular scenarios incompatible with container virtualization, virtualization system determines that the image can be realized as a container at that phase in the one or more states of virtualization.

In response to a determination that the image cannot be realized as a container (NO branch, 210), virtualization system 102 assigns a status of container incompatible to the image (216) and migrates the image to a virtual machine in a hypervisor-based environment (218). In one embodiment, virtualization system 102 assigns a status of container incompatible to the image, such as image 108, by flagging the image as container incompatible, wherein flagging includes modifying a previous status assignment as container compatible to container incompatible. In one embodiment, virtualization system 102 migrates the image to a virtual machine in a hypervisor-based environment, such as virtual machine 104, where migrating can include realizing the image in a traditional virtualization environment and abstracting a running container-based virtualization to a virtual machine in a hypervisor-based environment seamlessly and transparently, without apparent user awareness or intervention. Automatically migrating the image to a virtual machine in a hypervisor based environment in response to a determination that the image can no longer be realized as a container at various phases throughout its complete life cycle is advantageous because it allows a user to reap the benefits of both approaches to virtualization realization (i.e., container-based virtualization and traditional hypervisor-based virtualization) without user intervention or perceptual awareness.

In response to a determination that the image can be realized as a container (YES branch, 210), virtualization system 102 determines whether the series of checks is completed (212). In one embodiment, virtualization system 102 determines whether the series of checks is completed by determining whether the series of checks was performed on the image at each phase in the one or more states of virtualization. Where virtualization system 102 determines that the series of checks was performed on the image at each phase in the one or more states of virtualization, virtualization system 102 determines that the series of checks is complete. Where virtualization system 102 determines that the series of checks was not performed on the image at each phase in the one or more states of virtualization, virtualization system 102 determines that the series of checks is not complete.

In response to a determination that the series of checks was performed on the image at each phase in the one or more states of virtualization (YES branch, 212), virtualization system 102 realizes the image as a container (214).

In response to a determination that the series of checks was not performed on the image at each phase in the one or more states of virtualization (NO branch, 212), virtualization system 102 continues to perform the series of checks for container incompatibilities (208). In one embodiment, virtualization system 102 continues to perform the series of checks for container incompatibilities until all phases in the one or more states of virtualization are complete. In one embodiment, virtualization system 102 continuously monitors the one or more states of virtualization for the entire life cycle of the image/virtual machine virtualization. For example, virtualization system 102 may continuously monitor and perform a series of checks on an operable container virtualization, such as container 106, monitoring and intercepting each system call to ensure that each system call does not exceed the bounds of container realization.

Figure 3:
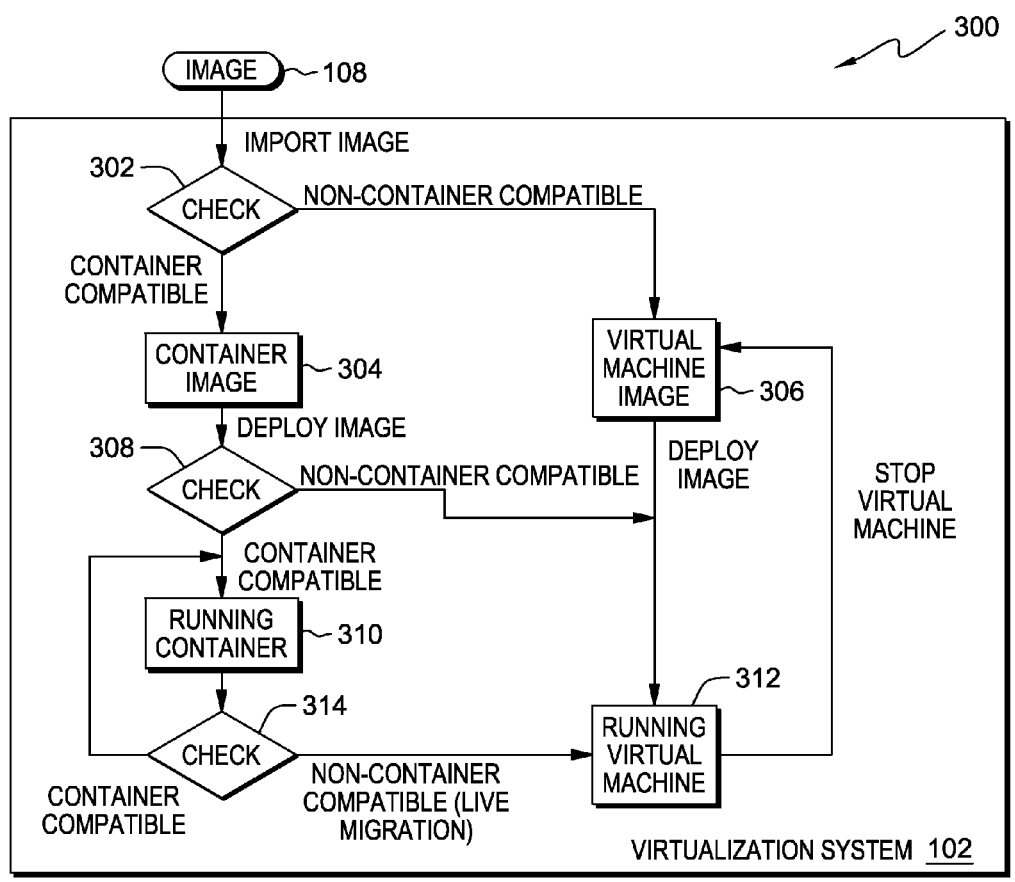
FIG. 3 is a flowchart of a process flow of a virtualization system, in accordance with an embodiment of the present invention.

FIG. 3 is a flowchart of a process flow of a virtualization system, such as virtualization system 102 of FIG. 1, generally designated 300, for virtual machine migration between hypervisor virtual machines and containers, in accordance with an embodiment of the present invention.

In response to user input to import image 108 into virtualization system 102, virtualization system 102 performs check 302 on image 108. In one embodiment, check 302 includes scanning image 108 for container incompatibilities to determine an initial status assignment, where the initial status assignment can be, for example, container compatible or non-container compatible. Additionally, check 302 represents a first phase of one or more phases throughout the various states of virtualization in which virtualization system performs a series of checks for container incompatibilities. For example, where the first phase is an inspection stage following the importation of an image, such as image 108, into virtualization system 102, virtualization system 102 may scan image 108 for container incompatibilities by performing a series of checks for particular scenarios (i.e., bounds) where container virtualization cannot be utilized, such as when a guest operating system is an operating system variant that is not compatible with container virtualization (e.g., non-Linux operating system).

Where virtualization system 102 detects a particular scenario where container virtualization cannot be utilized, virtualization system 102 determines an initial status assignment of, for example, non-container compatible. Virtualization system 102 assigns the initial status assignment of non-container compatible to image 108, thereby effectively classifying the image as a virtual machine image, such as virtual machine image 306, for realization in a traditional virtualization environment.

Where virtualization system 102 does not detect a particular scenario where container virtualization cannot be utilized, virtualization system 102 determines an initial status assignment of, for example, container compatible. Virtualization system 102 assigns the initial status assignment of container compatible to image 108, thereby effectively classifying the image as a container image, such as container image 304, for realization in a container-based virtualization environment.

In response to user input to deploy an image, such as virtual machine image 304, virtualization system 102 realizes the image as a traditional virtual machine in a hypervisor based virtualization environment, such as running virtual machine 312, seamlessly and transparently without apparent user awareness or intervention.

In response to user input to deploy an image, such as container image 304, virtualization system 102 performs check 308 on container image 304. In one embodiment, check 308 includes scanning container image 304 for container incompatibilities to determine whether the image can be realized as a container, where the initial status assignment was, for example, container compatible. Additionally, check 308 represents a second phase of one or more phases throughout the various states of virtualization in which virtualization system 102 performs a series of checks for container incompatibilities. For example, where the second phase is a provision (i.e., boot) time instructions stage following the deployment of an image, such as container image 304, within virtualization system 102, virtualization system 102 may inspect container image 304 for container incompatibilities by performing a series of checks (e.g., inspect preload/bootstrap instructions to ensure they do not load non-container modules) for particular scenarios (i.e., bounds) where container virtualization cannot be utilized, such as when a user specifies additional packages be loaded that render container image 304 not applicable for container-based virtualization.

Where virtualization system 102 detects a particular scenario where container virtualization cannot be utilized, virtualization system 102 determines an updated status assignment of, for example, non-container compatible. Virtualization system 102 assigns the updated status assignment of non-container compatible to container image 304, thereby effectively handling the image as a virtual machine image, such as virtual machine image 306, for realization in a traditional virtualization environment. Additionally, in response to assigning the updated status of non-container compatible to the image, virtualization system 102 realizes the image as a traditional virtual machine in a hypervisor based virtualization environment, such as running virtual machine 312, seamlessly and transparently without apparent user awareness or intervention.

Where virtualization system 102 does not detect a particular scenario where container virtualization cannot be utilized, virtualization system 102 realizes container image 304 in a container-based virtualization environment, such as running container 310.

In response to realizing an image, such as container image 304, in a container-based virtualization environment, such as running container 310, virtualization system 102 performs check 314 on running container 310. In one embodiment, check 314 includes scanning running container 310 for container incompatibilities to determine whether running container 310 can continue to operate as a container-based virtualization. Additionally, check 314 represents a third phase of one or more phases throughout the various states of virtualization in which virtualization system 102 performs a series of checks for container incompatibilities. For example, where the third phase is a runtime system call stage following the realization of an image, such as container image 304, in a container-based virtualization, such as running container 310 within virtualization system 102, virtualization system 102 may inspect running container 310 for container incompatibilities by performing a series of checks (e.g., monitor and intercept certain system calls on behalf of container processes) for particular scenarios (i.e., bounds) where container virtualization cannot be utilized, such as when a user attempts to install or load additional kernel modules that are restricted via container capabilities, container confinement, etc.

Where virtualization system 102 detects a particular scenario where container virtualization cannot be utilized, virtualization system 102 determines an updated status assignment of, for example, non-container compatible. Virtualization system 102 assigns the updated status assignment of non-container compatible to running container 310, thereby effectively classifying the container as a traditional virtual machine in a hypervisor based virtualization environment, such as running virtual machine 312. Additionally, in response to assigning the updated status of non-container compatible to the container, virtualization system 102 performs a live migration of the container to a traditional virtual machine in a hypervisor based virtualization environment, such as running virtual machine 312, seamlessly and transparently without apparent user awareness or intervention. Additionally, where running virtual machine 312 is taken offline (i.e., stop operation), the image once classified as a container image, such as container image 304, is now classified as a virtual machine image, such as virtual machine image 306, for the purposes of future deployments.

Where virtualization system 102 does not detect a particular scenario where container virtualization cannot be utilized, virtualization system 102 continues to perform one or more additional series of checks on running container 310 for particular scenarios where container virtualization cannot be utilized, such as continuously monitoring the state of running container 310, throughout its entire life cycle, to determine whether the container can continue to operate in a container-based environment.

Figure 4:
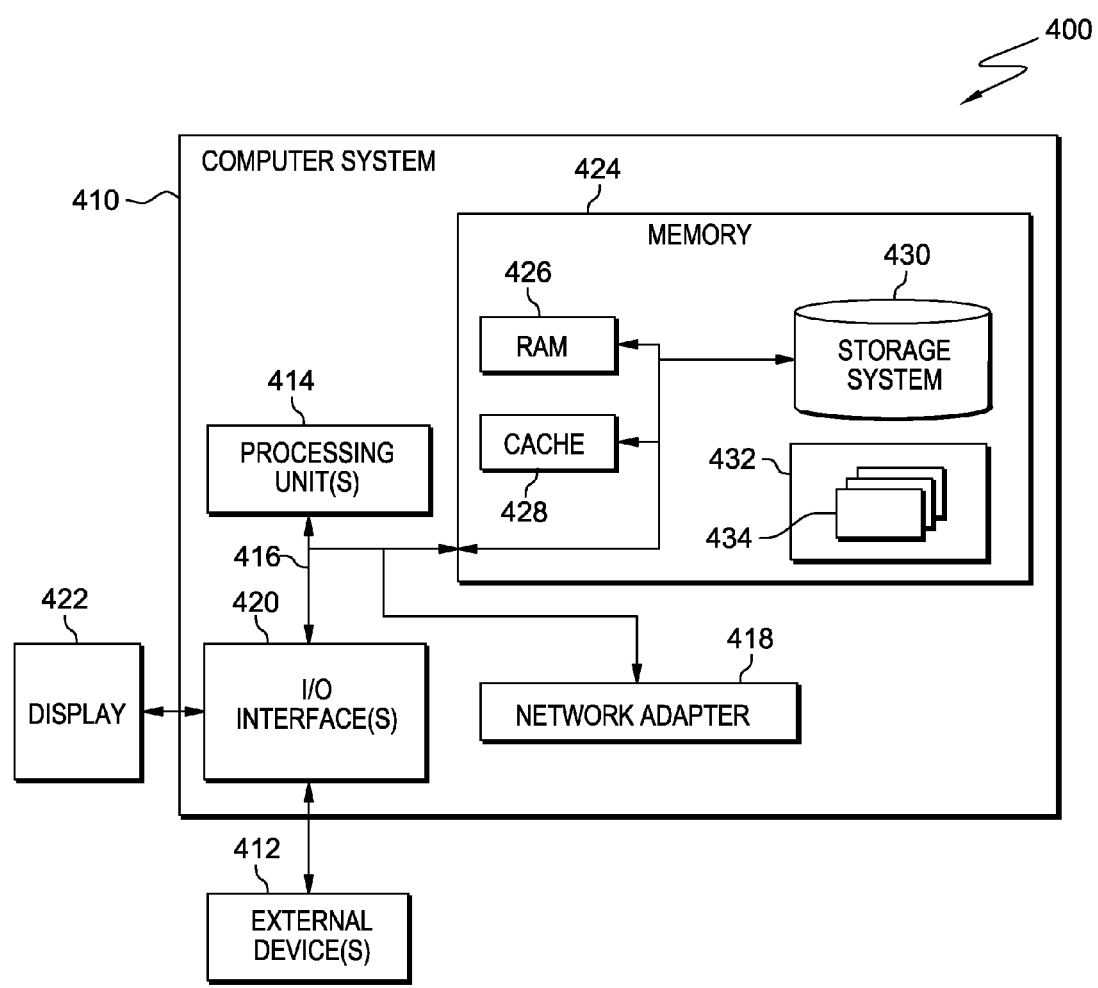
FIG. 4 is a block diagram depicting components of a data processing system (such as the virtualization system of FIG. 1), in accordance with an embodiment of the present invention.

FIG. 4 depicts a block diagram of components of a data processing system, generally designated 400, in data processing environment 100, such as virtualization system 102 in accordance with an illustrative embodiment of the present invention. It should be appreciated that FIG. 4 provides only an illustration of one implementation and does not imply any limitations with regard to the environments in that different embodiments may be implemented. Many modifications to the depicted environment can be made. In an embodiment, data processing system 400 is a cloud computing node, and is only one example of a suitable cloud computing node and is not intended to suggest any limitation as to the scope of use or functionality of embodiments of the invention described herein. Regardless, data processing system 400 is capable of being implemented and/or performing any of the functionality set forth hereinabove.

In the illustrative embodiment, virtualization system 102 in data processing environment 100 is shown in the form of a general-purpose computing device, such as computer system 410. The components of computer system 410 may include, but are not limited to, one or more processors or processing unit(s) 414, memory 424, and bus 416 that couples various system components including memory 424 to processing unit(s) 414. Computer system 410 may be described in the general context of computer system-executable instructions, such as program modules, being executed by a computer system. Generally, program modules may include routines, programs, objects, components, logic, data structures, and so on that perform particular tasks or implement particular abstract data types. Computer system 410 may be practiced in distributed cloud computing environments where tasks are performed by remote processing devices that are linked through a communications network. In a distributed cloud computing environment, program modules may be located in both local and remote computing system storage media including memory storage devices.

Bus 416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 410 typically includes a variety of computer system readable media. Such media may be any available media that is accessible by computer system 410, and it includes both volatile and non-volatile media, removable and non-removable media.

Memory 424 can include computer system readable media in the form of volatile memory, such as random access memory (RAM) 426 and/or cache memory 428. Computer system 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, memory 424 may include at least one computer program product having a set (e.g., at least one) of program modules that are configured to carry out the functions of embodiments of the invention.

Program/utility 432, having one or more sets of program modules 434, may be stored in memory 424 by way of example, and not limitation, as well as an operating system, one or more application programs, other program modules, and program data. Each of the operating systems, one or more application programs, other program modules, and program data, or some combination thereof, may include an implementation of a networking environment. Program modules 434 generally carry out the functions and/or methodologies of embodiments of the invention as described herein. Computer system 410 may also communicate with one or more external device(s) 412 such as a keyboard, a pointing device, a display 422, etc., or one or more devices that enable a user to interact with computer system 410 and any devices (e.g., network card, modem, etc.) that enable computer system 410 to communicate with one or more other computing devices. Such communication can occur via Input/Output (I/O) interface(s) 420. Still yet, computer system 410 can communicate with one or more networks such as a local area network (LAN), a general wide area network (WAN), and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives, and data archival storage systems may be used in conjunction with computer 410.

Implementation of such embodiments may take a variety of forms, and exemplary implementation details are discussed subsequently with reference to the Figures.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or an external storage device via a network, for example, the Internet, a local area network, a wide area network and/or a wireless network. The network may comprise of copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In another embodiment, the invention provides a method that performs the process of the invention on a subscription, advertising, and/or fee basis. That is, a service provider, such as a Solution Integrator, could offer to provide virtual machine migration between hypervisor virtual machines and containers functionality. In this case, the service provider can create, maintain, and support, etc., a computer infrastructure, such as computer system 410 (FIG. 4) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for virtual machine migration between hypervisor virtual machines and containers. In this case, a computer infrastructure, such as computer system 410 (FIG. 4), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 410 (FIG. 4), from a computer-readable medium; (2) adding one or more computing devices to the computer infrastructure; and (3) incorporating and/or modifying one or more existing systems of the computer infrastructure to enable the computer infrastructure to perform the processes of the invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processors, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the invention. The terminology used herein is chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for virtual machine migration between at least one hypervisor virtual machine and at least one container, the method comprising:
    performing, by one or more computer processors, an initial inspection of an image, wherein performing the initial inspection includes scanning the image to determine whether boot instructions for the image contain a non-standard kernel module for loading a container-based virtualization environment;
assigning, by one or more computer processors, an initial status to the image, wherein the initial status identifies a type of virtualization realization compatible with the image;
performing, by one or more computer processors, a series of checks for container incompatibilities;
determining, by one or more computer processors, whether the image can be realized as a container; and
responsive to a determination that the image can be realized as a container, realizing, by one or more computer processors, the image in a container based virtualization.

2. The method of claim 1, wherein performing an initial inspection of an image, further comprises:
scanning, by one or more computer processors, the image to determine whether a guest operating system within the image is an operating system variant compatible with container-based virtualization.

3. The method of claim 2 further comprises:
responsive to a determination that a guest operating system is an operating system variant that is container compatible and the image does not include a non-standard kernel module, assigning, by one or more computer processors, an initial status of container compatible to the image.

4. The method of claim 2 further comprises one of:
responsive to a determination that a guest operating system is not an operating system variant that is container compatible, assigning, by one or more computer processors, an initial status of container incompatible to the image; and
responsive to a determination that the image includes a non-standard kernel module, assigning, by one or more computer processors, an initial status of container incompatible to the image.

5. The method of claim 1, wherein performing a series of checks for container incompatibilities, further comprises:
monitoring, by one or more computer processors, an image at one or more phases throughout one or more states in virtualization for a life cycle of an image virtualization, wherein the one or more states in virtualization include at least one of image deployment and running virtualization, and the one or more phases includes at least one of an image importation phase, a provision time instructions phase, and a runtime system call phase; and
inspecting, by one or more computer processors, the image throughout each of the one or more phases in the one or more states in virtualization, where inspecting includes scanning the image for a plurality of particular scenarios incompatible with container virtualization.

6. The method of claim 1, wherein determining whether the image can be realized as a container, further comprises:
determining, by one or more computer processors, whether the image falls outside one or more bounds of container virtualization, wherein determining whether the image falls outside one or more bounds of container virtualization includes detecting one or more scenarios from a plurality of particular scenarios incompatible with container virtualization.

7. The method of claim 6 further comprises:
responsive to a determination that the image falls outside one or more bounds of container virtualization, determining, by one or more computer processors, that the image cannot be realized as a container.

8. The method of claim 7, wherein determining that the image cannot be realized as a container, further comprises:
assigning, by one or more computer processors, a status of container incompatible to the image, wherein assigning the status of container incompatible includes modifying a previous status assignment as container compatible to container incompatible.

9. The method of claim 8, wherein assigning a status of container incompatible to the image, further comprises:
migrating, by one or more computer processors, the image to a virtual machine in a hypervisor-based environment, where migrating the image includes one or more of:
realizing the image in a traditional virtualization environment; and
abstracting a running container-based virtualization to a virtual machine in a hypervisor-based environment.

10. The method of claim 6 further comprises:
responsive to a determination that the image does not fall outside one or more bounds of container virtualization, determining, by one or more computer processors, that the image can be realized as a container.

11. A computer program product for virtual machine migration between at least one hypervisor virtual machine and at least one container, the computer program product comprising:
one or more computer readable storage media and program instructions stored on the one or more computer readable storage media, the program instructions comprising:
program instructions to perform, by one or more computer processors, an initial inspection of an image, wherein performing the initial inspection includes scanning the image to determine whether boot instructions for the image contain a non-standard kernel module for loading a container-based virtualization environment;
program instructions to assign, by one or more computer processors, an initial status to the image, wherein the initial status identifies a type of virtualization realization compatible with the image;
program instructions to perform, by one or more computer processors, a series of checks for container incompatibilities;
program instructions to determine, by one or more computer processors, whether the image can be realized as a container; and
responsive to a determination that the image can be realized as a container, program instructions to realize, by one or more computer processors, the image in a container based virtualization.

12. The computer program product of claim 11, wherein program instructions to perform an initial inspection of an image, further comprises:
program instructions to scan, by one or more computer processors, the image to determine whether a guest operating system within the image is an operating system variant compatible with container-based virtualization.

13. The computer program product of claim 11, wherein program instructions to perform a series of checks for container incompatibilities, further comprises:
program instructions to monitor, by one or more computer processors, an image at one or more phases throughout one or more states in virtualization for a life cycle of an image virtualization, wherein the one or more states in virtualization include at least one of image deployment and running virtualization, and the one or more phases includes at least one of an image importation phase, a provision time instructions phase, and a runtime system call phase; and program instructions to inspect, by one or more computer processors, the image throughout each of the one or more phases in the one or more states in virtualization, where inspecting includes scanning the image for a plurality of particular scenarios incompatible with container virtualization.

14. The computer program product of claim 11, wherein program instructions to determine whether the image can be realized as a container, further comprises:

program instructions to determine, by one or more computer processors, whether the image falls outside one or more bounds of container virtualization, wherein determining whether the image falls outside one or more bounds of container virtualization includes detecting one or more scenarios from a plurality of particular scenarios incompatible with container virtualization.

15. The computer program product of claim 14 further comprises:

responsive to a determination that the image falls outside one or more bounds of container virtualization, program instructions to determine, by one or more computer processors, that the image cannot be realized as a container.

16. A computer system for virtual machine migration between at least one hypervisor virtual machine and at least one container, the computer system comprising:

one or more computer readable storage media;

program instructions stored on at least one of the one or more computer readable storage media for execution by at least one of the one or more computer processors, the program instructions comprising:

program instructions to perform, by one or more computer processors, an initial inspection of an image, wherein performing the initial inspection includes scanning the image to determine whether a guest operating system within the image is an operating system variant compatible with container-based virtualization and scanning the image to determine whether boot instructions for the image contain a non-standard kernel module for loading a container-based virtualization environment;

program instructions to assign, by one or more computer processors, an initial status to the image, wherein the initial status identifies a type of virtualization realization compatible with the image;

program instructions to perform, by one or more computer processors, a series of checks for container incompatibilities;

program instructions to determine, by one or more computer processors, whether the image can be realized as a container; and responsive to a determination that the image can be realized as a container, program instructions to realize, by one or more computer processors, the image in a container based virtualization.

17. The computer system of claim 16, wherein program instructions to perform an initial inspection of an image, further comprises:

program instructions to scan, by one or more computer processors, the image to determine whether a guest operating system within the image is an operating system variant compatible with container-based virtualization.

18. The computer system of claim 16, wherein program instructions to perform a series of checks for container incompatibilities, further comprises:

program instructions to monitor, by one or more computer processors, an image at one or more phases throughout one or more states in virtualization for a life cycle of an image virtualization, wherein the one or more states in virtualization include at least one of image deployment and running virtualization, and the one or more phases include at least one of an image importation phase, a provision time instructions phase, and a runtime system call phase; and program instructions to inspect, by one or more computer processors, the image throughout each of the one or more phases in the one or more states in virtualization, where inspecting includes scanning the image for a plurality of particular scenarios incompatible with container virtualization.

19. The computer system of claim 16, wherein program instructions to determine whether the image can be realized as a container, further comprises:

program instructions to determine, by one or more computer processors, whether the image falls outside one or more bounds of container virtualization, wherein determining whether the image falls outside one or more bounds of container virtualization includes detecting one or more scenarios from a plurality of particular scenarios incompatible with container virtualization.

20. The computer system of claim 19 further comprises:

responsive to a determination that the image falls outside one or more bounds of container virtualization, program instructions to determine, by one or more computer processors, that the image cannot be realized as a container.

* * * * *